United States Patent [19]

Autrey et al.

[11] 4,442,130
[45] Apr. 10, 1984

[54] CONTINUOUS PROCESSING OF RICE

[75] Inventors: Harry S. Autrey; John W. Hunnell, both of Houston, Tex.

[73] Assignee: Riviana Foods, Inc., Houston, Tex.

[21] Appl. No.: 339,076

[22] Filed: Jan. 13, 1982

[51] Int. Cl.³ ............................. A23L 1/10; A23B 9/00
[52] U.S. Cl. ...................................... 426/462; 99/483; 110/344; 426/508; 426/618
[58] Field of Search ............... 426/462, 482, 481, 467, 426/618, 508, 520, 523; 110/344, 348; 99/483

[56] References Cited

U.S. PATENT DOCUMENTS 3,125,043  3/1964  Gravel .................................. 110/344
3,925,564  12/1975  Finnell .................................. 426/482

FOREIGN PATENT DOCUMENTS 672887  10/1963  Canada .................................. 426/467

Primary Examiner—Raymond N. Jones
Assistant Examiner—George C. Yeung
Attorney, Agent, or Firm—LeBlanc, Nolan, Shur & Nies

[57] ABSTRACT

A method for processing rice wherein paddy rice is heat treated, the heat treated rice is shelled to separate the hulls from the brown rice, the hulls are fed into a burner unit wherein they are burned in two stages to produce ash and relatively clean hot gases, and the hot gases are cycled for use in the heat treating phase.

4 Claims, 1 Drawing Figure

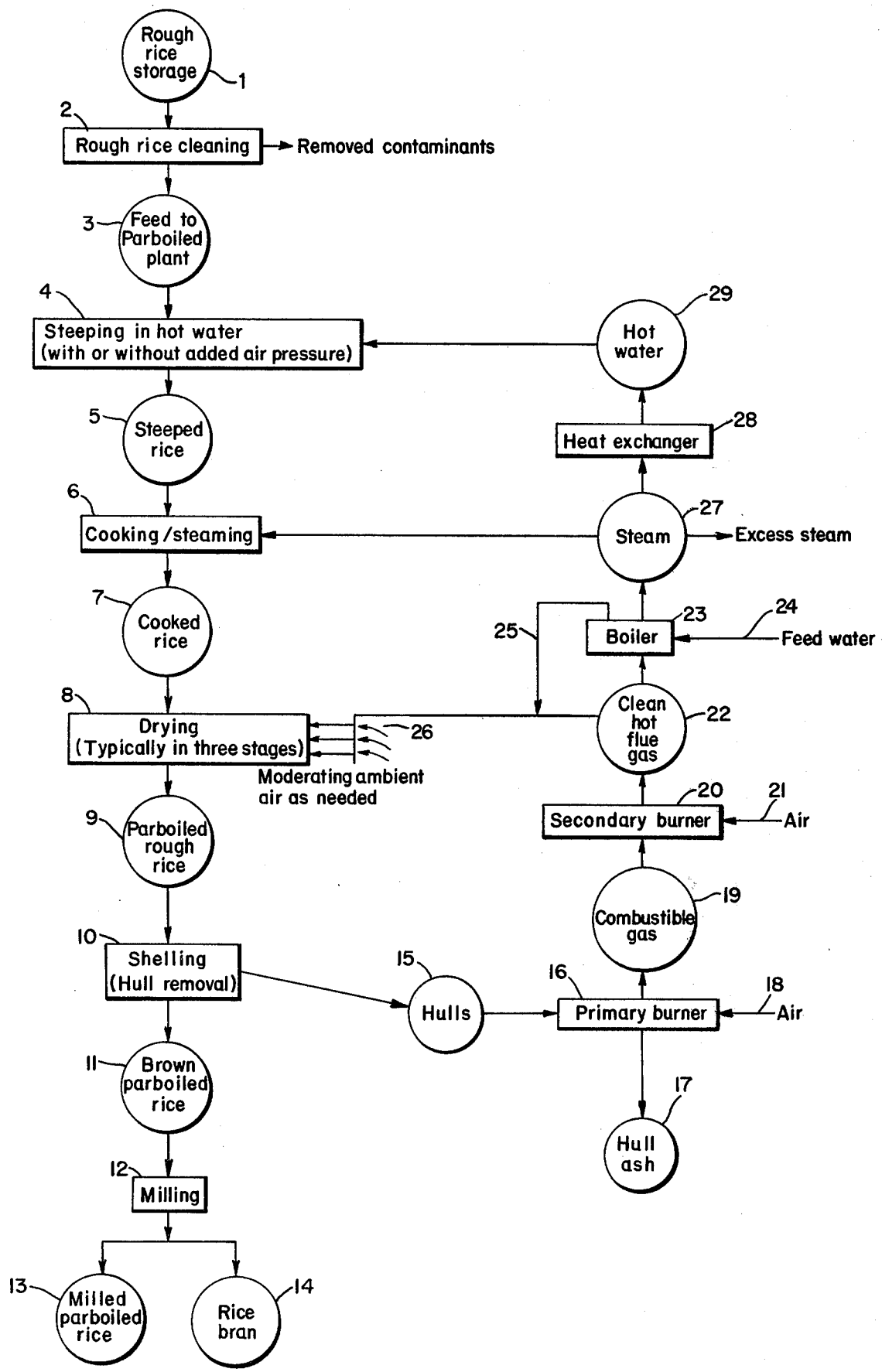

CONTINUOUS PROCESSING OF RICE

This invention relates to the efficient processing of parboiled rice and particularly to novel methods and apparatus wherein rice hulls separated from paddy rice after the paddy rice has been subjected to the processing operations required for parboiling involving heat treatment are burned to produce a desirable ash product and recovered heat from controlled combustion which is used in the heat treatment phases, in a substantially continuous self-sustaining operation.

Paddy rice harvested from the fields and dried to a stable moisture of 12 to 14 percent consists of a hull or husk surrounding the rice grain. The hull constitutes about 15 to 25 percent of the paddy rice by weight, and the invention here is concerned with the efficient use of hulls.

Since rice processing is one of the oldest arts, there has been considerable effort to find beneficial and profitable and use for the hulls which may be considered as the inevitable product of all rice processing. Currently, rice hulls are disposed by returning them to the field soil, or as a relatively low value material for chicken litter, animal feed roughage, fruit juice pressing aid, substrate for furfural production, medicated animal feed carrier or as an extender for plastics. Some are hauled away and dumped.

One of the major uses proposed and to a limited degree practiced has been to utilize the hulls as boiler fuel to produce steam, frequently where the rice mill uses steam engines for power.

Among the current uses of rice hulls is that based on the fact that rice hulls contain 20 percent ash and when almost completely burned the ash product will contain about 85-98 percent silicates. Ash of this composition has several beneficial uses, for example as a component of refractory material as indicated in U.S. Letters Patents to Jones No. 2,720,427, and Rowland No. 3,489,581.

In this invention rice hulls derived from paddy rice which has been subjected to a heat treatment process, have been separated into hull and brown rice components, and are burned in a two stage burner wherein silica-containing ash is produced and volatile components separate therefrom in a first stage, the volatile components are burned to provide clean dry hot gases in a second stage and these hot gases are directed to supply the necessary heat in various steps of parboiling whereby a continuous self sustaining operation is attained.

A further advantage of the invention is that it can provide a novel continuous system wherein paddy rice is parboiled, the hulls are separated from the parboiled rice, the separated hulls are burned and heat from the products of combustion is directed to effect the parboiling operation.

Another feature of the invention comprises a novel rice processing system including a two stage burning method and apparatus wherein in a first stage rice hulls are essentially continuously fed into an air agitated mass above a supporting grate and are burned at a temperature below the fusion point of silica but sufficient to drive off the organic volatile components and wherein the volatile components are completely burned at a much higher temperature in a second stage to provide clean hot gases consisting essentially of carbon dioxide and water, with these hot gases being continuously recirculated into the system to provide heat for the rice processing phases.

The U.S. patent to Gravel No. 3,125,043 discloses apparatus and a process wherein volatile components are removed from burning rice hulls, but there is no disclosure therein of two stage burning and/or of the use of the cleanly burned gas from the second stage to treat directly the rice processed.

BRIEF DESCRIPTION OF DRAWING

The drawing diagrammatically illustrates the system of the invention according to a preferred embodiment.

PREFERRED EMBODIMENTS

The invention will be described specifically in a continuous method and apparatus wherein rice hulls are burned to separately produce on the one hand silica-containing ash with the silica in the desired form, and on the hand clean gas that is directly utilized in contact with rice in a treatment operation such as parboiling.

With reference to the drawing the major steps of a rice parboiling operation with the associated steps of a two stage burning of rice hulls are designated in rectangular figures and the products at each stage in circular figures with directional lines indicating flow.

In this operation rough or paddy rice is removed from storage (1) cleaned, (2) to remove contaminants such as dirt, straw, loose hulls and grains without hulls to produce clean paddy ricefeed, (3) which is fed into tanks, (4) wherein it is covered by hot water and allowed to steep for a period of time. In this steep the moisture content of the rice is increased from 12 to 14 percent to typically about 37 percent in water introduced at a range of 145° F. to 170° F. The temperature of this water and the optional use of air pressure permit control of the time required to reach the desired moisture content in the rice. This operation may be continuous by batch with a series of steeping tanks employed. The steeping time may be about 40–60 minutes to a few hours depending upon the feed rice quality and the desired characteristics of the finished parboiled rice.

The steeped rice (5) is conveyed to a second heat processing section, (6) wherein the starch is gelatinized in place in a steam atmosphere for a desired time. Typically this will be done at a steam pressure of 8–10 pounds per square inch gauge with a residence time of about 5–15 minutes.

The steamed or cooked rice (7) is conveyed into a drying section (8) where the moisture is reduced by the action heated air in a series of, usually three, stepped stages wherein the temperature is carefully controlled. In a typical process the temperature of the drying mixture of gas and air will be about 500°–600° F., and 200°–300° F. respectively, and the tempratures of the rice removed from those stages will be about 180° F. and 100° F. Between drying steps the moisture in the kernel will migrate from the center to the surface with the surface region having been dried more than the center in the previous drying step. Upon reaching ambient temperature the moisture content will have been reduced back to about 13 percent and stable parboiled rough or paddy rice (9) will have been produced. This product rice (9) is conveyed to a sheller machine (10) wherein the rice grains are removed from the hulls (15) and brown rice (11) is discharged and sent to milling machines (12) where the bran is removed and finished primary product of parboiled rice (13) and by-product rice bran (14) are recovered.

The rice hulls (15) are conveyed into the first stage or primary burner (16) where they ignite and are burned in a chamber on a grate structure which permits ash (17) to be removed. An air supply (18) is introduced on a controlled basis to regulate the temperature of combustion. The remaining products of combustion (19) are gaseous and rise to a second stage burner (20) where combustion is completed at a higher temperature and the clean hot gas is drawn off and continuously supplied to the dryers and to a boiler to supply heat for the various operations of parboiling. Combustion in the second stage burner (20) takes place in an excess of oxygen introduced with a forced air stream (21).

The dry hulls entering the primary burner have a moisture content generally in the range of 12–14 percent. Since they are of light weight and substantially in uniform particulate condition, they may readily be controllably fed in a smooth essentially uniform stream by a ram. The grate is of a convenient area with a multiplicity of perforations enabling the air to pass through the grate while at the same time providing for the hulls accumulating in a pile or loose mass supported on the grate. Some combustion air of course enters the burner with the hulls and added combustion air is preferably provided as at (18). The design of the grate and the pressures involved in feeding in the hulls and combustion air are mutually correlated to ensure that once on the grate the hulls are supported thereon in a relatively loose, easily ignited and steadily burning mass.

The openings in the grate are advantageously sized whereby they contribute to breakup and further particularize the hull fragments, so that the mass collecting over the grate contains relatively uniformly sized small particles capable of partial air support on the grate and efficient combustion. At start up an igniter is energized to start combustion of the mass of hulls on the grate but after a short time the igniter may be de-energized since the mass becomes self-combustible. The rate of combustion is correlated to the speed of infeed hulls so that the burning process becomes continuous.

Burning of rice hulls within the first stage chamber (16) takes place in a temperature range below the fusion point of silica and advantageously takes place in a range of about 1650° F. to 1800° F. At these temperatures the moisture is dissippated and the solid hulls are converted partially into a powdery ash which has a very high silica content and the balance into a swirling mixture of volatile gases. The ash falls off mainly to the edge of the mass to be pushed off the outer periphery of the grate by radial sweeps revolving at the upper surface of the grate concentrically therewith. The discharged ash is recovered (17), and the volatile gases rise into the second stage chamber (20) of the burner.

As the volatile gases from the fuel bed on the grate they may be subjected to a cyclonic scrubbing action by a series of high velocity air inlets. This results in any solid particles such as carbon entrained in the rising gases being entrained and carried outwardly to the chamber wall where they abut and drop back toward the grate. Thus the volatile gases entering the second stage burner contain substantially no solid particles.

By maintaining the temperatures within the primary burner below 2000° F. it is ensured that higher temperatures required to burn the volatile gases are not produced, and as a result there is no fusion of the ash to produce a solid clinker structure that would interfere with hull fragment feed and efficiency of combustion.

The volatile gases rising into and through the second stage chamber (20) of the burner combine with the introduced excess air from conduit (21) and complete combustion occurs at a much higher temperature, advantageously about 2000° F.–2400° F. At least about 15 percent excess air by volume is introduced at (21). The inner wall of the secondary burner chamber (20)is preferably cylindrical so that the volatile gases rise in a generally helical path. The excess air from the conduit (21) enters tangentially at the chamber upper end and moves mainly downwardly in a generally helical path in counter flow relation to the gases, whereby there is a relatively cool outer vortex of gas adjacent the chamber wall while the volatiles are burned at high temperature in the swirling inner vortex.

Suitable burners having provision for both the primary and secondary burning steps are available as the Lamb Wet All Burner from Lamb Cargate Industries, Ltd., P.O. Box 400, 1135 Queens Avenue, New Westminster, B.C., V3L4Y6, Canada. Suitable burner apparatus having provision for both primary and secondary burning are sold by Econo-Therm Energy Systems Corp., 11535 K Tel Drive, Minnetonka, Minn. 55343, USA, as their Controlled Air Incinerator Model CA2500.

As a result of the foregoing, clean hot gases free of particulate and other objectionable material exit the second stage burner (20) through a conduit which is connected to both a boiler (23) having fresh water input (24) with exhaust returned to the main stream (25), and directly to the drying section (8). The hot gases directly contact the rice for more efficient heat transfer. Since the volatile organics (phenols, creosotes, etc.) have been consumed in the high temperature second stage burner, the gases do not impart objectionable flavor or odor to the rice in process.

Gas control valving and cooling devices indicated at (26) are placed so as to perform the heating requirements of the dryers. In each of the dryers cooling may be accomplished for example by blending in ambient air in sufficient quantity to provide for the necessary drop in gas temperature.

Steam (27) generated in the boiler (23) is used for the cooking/steaming step (6) and to heat water in a heat exchanger (28). The hot water (29) so produced is used for the steeping operation (4).

In some embodiments a portion of the heated gases may be extracted and recycled whereby to preheat the incoming stream of hulls, thereby promoting overall efficiency.

The invention in the disclosed embodiment provides a system for generating a hot clean gas in quantity, quality and temperature sufficient to satisfy heat needs for hot water, steam and drying in a parboil plant. The hulls are burned in two stages. The first stage is held below the fusion point of silica and makes a valuable ash product and drives off the organics and volatiles which are essentially completely burned to $CO_2$ and water leaving a clean hot gas for introduction into the heat requiring phases.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a method for producing parboiled rice which comprises the steps of heat treating paddy rice to produce cooked rice, shelling the cooked rice to produce hulls and brown rice, feeding said hulls to a burner wherein the hulls are burned in a first stage under controlled temperature conditions below the fusion point of silica to produce ash and volatile components and whereby said volatile components are delivered to a second stage where complete combustion of said volatile components takes place in a higher temperature range, and feeding at least a portion of the products of combustion resulting from said second stage combustion into direct contact with said cooked rice to effect predetermined drying of said cooked rice.

2. The method defined in claim 1, wherein said method is substantially continuous and cyclic.

3. A substantially continuous self-sustaining method for parboiling rice in a sequence wherein paddy rice is steeped, cooked and dried comprising the steps of hulling the dried rice, burning the hulls in a first stage at a predetermined controlled temperature to drive off the volatile components and then effecting complete combustion of said volatile components in a second stage at a temperature higher than said predetermined controlled temperature in the presence of excess oxygen to produce hot products of combustion to provide the heat requisite to the drying steps of the parboiling sequence, at least a substantial portion of said hot products of combustion being delivered to said rice in direct contact therewith during the drying operation.

4. A method for producing parboiled rice which comprises the steps of heat treating paddy rice to produce cooked rice, shelling the cooked rice to produce hulls and brown rice, feeding said hulls to a burner wherein the hulls are burned to produce ash and relatively clean hot gases, said hulls being burned in a first stage in an air agitated fluid bed at a temperature in the range of 1650° F. to 1800° F. which is below the fusion point of silica wherein the volatile components are driven off and delivered to a second stage where complete combustion of the volatile components takes place in a higher range of from 2000° F. to 2400° F. in the presence of excess oxygen, and feeding at least a portion of said hot gases into direct contact with said cooked rice to effect predetermined drying of said cooked rice.

* * * * *

UNITED STATES PATENT AND TRADEMARK OFFICE
CERTIFICATE OF CORRECTION

PATENT NO. : 4,442,130
DATED : April 10, 1984
INVENTOR(S) : Harry S. Autrey and John W. Hunnell It is certified that error appears in the above-identified patent and that said Letters Patent are hereby corrected as shown below:

On the title page
(73) Assignee: "Riviana Foods, Inc." should be

--Riviana Foods Inc.--.

Signed and Sealed this

Eighteenth Day of June 1985

[SEAL]

Attest:

DONALD J. QUIGG

Attesting Officer     Acting Commissioner of Patents and Trademarks